(12) United States Patent
Zhao et al.

(10) Patent No.: US 11,578,456 B2
(45) Date of Patent: Feb. 14, 2023

(54) CELLULOSE FIBERS, CELLULOSE FIBER-CONTAINING COMPOSITION, CELLULOSE FIBER DISPERSION, AND METHOD FOR PRODUCING CELLULOSE FIBERS

(71) Applicant: OJI HOLDINGS CORPORATION, Tokyo (JP)

(72) Inventors: Mengchen Zhao, Tokyo (JP); Yusuke Todoroki, Chiba (JP); Yuichi Noguchi, Tokyo (JP); Ikue Sugiyama, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 713 days.

(21) Appl. No.: 16/489,917

(22) PCT Filed: Mar. 1, 2018

(86) PCT No.: PCT/JP2018/007711
§ 371 (c)(1),
(2) Date: Aug. 29, 2019

(87) PCT Pub. No.: WO2018/159743
PCT Pub. Date: Sep. 7, 2018

(65) Prior Publication Data
US 2020/0002883 A1    Jan. 2, 2020

(30) Foreign Application Priority Data
Mar. 1, 2017  (JP) .............. JP2017-038708
Dec. 21, 2017  (JP) .............. JP2017-244757

(51) Int. Cl.
*D06M 11/71*    (2006.01)
*C08L 1/08*    (2006.01)
(Continued)

(52) U.S. Cl.
CPC .............. *D06M 11/71* (2013.01); *C08L 1/08* (2013.01); *D21H 11/20* (2013.01); *D06M 2101/06* (2013.01); *D06M 2400/01* (2013.01)

(58) Field of Classification Search
CPC .. C08L 1/08; C08L 1/00; D21H 11/20; D21H 17/10; D21H 11/04; D21H 15/00; C08B 15/05; C08B 15/00
See application file for complete search history.

(56) References Cited

U.S. PATENT DOCUMENTS

2015/0225552 A1*  8/2015  Akai ................. C08L 1/02
                                                                    428/401
2016/0115249 A1*  4/2016  Noguchi ............. C08B 5/00
                                                                    536/62

FOREIGN PATENT DOCUMENTS

CN    102791789 A    11/2012
CN    105209686 A    12/2015
(Continued)

OTHER PUBLICATIONS

Machine translation of JP 2015101694 A originally published Jun. 2015 to Isogai et al. (Year: 2015).*
(Continued)

*Primary Examiner* — Coris Fung
*Assistant Examiner* — Ritu S Shirali
(74) *Attorney, Agent, or Firm* — Sughrue Mion, PLLC

(57) ABSTRACT

It is an object of the present invention to provide ultrafine cellulose fibers capable of exhibiting favorable dispersibility even in an organic solvent. The present invention relates to cellulose fibers having a fiber width of 1000 nm or less and having phosphoric acid groups or phosphoric acid group-derived substituents, wherein the content of the phosphoric acid groups or phosphoric acid group-derived substituents is (Continued)

0.5 mmol/g or more, and the supernatant yield measured by an measurement method (a) is 70% or less.

7 Claims, 2 Drawing Sheets

(51) Int. Cl.
*D21H 11/20* (2006.01)
*D06M 101/06* (2006.01)

(56) References Cited

FOREIGN PATENT DOCUMENTS

| | | | |
|---|---|---|---|
| EP | 2 884 000 A1 | | 6/2015 |
| EP | 2 998 435 A1 | | 3/2016 |
| JP | H09-509694 A | | 9/1997 |
| JP | 2010-186124 A | | 8/2010 |
| JP | 2011-1559 A | | 1/2011 |
| JP | 2011-047084 A | | 3/2011 |
| JP | 2011-140738 A | | 7/2011 |
| JP | 2012-021081 A | | 2/2012 |
| JP | 2013127141 A | | 6/2013 |
| JP | 2014227525 A | * | 12/2014 |
| JP | 2015-101694 A | | 6/2015 |
| JP | 2015-189698 A | | 11/2015 |
| JP | 2017-2231 A | | 1/2017 |
| JP | 2017-52943 A | | 3/2017 |
| JP | 2017-65109 A | | 4/2017 |
| JP | 2018-141249 A | | 9/2018 |
| WO | 2014/024876 A1 | | 2/2014 |
| WO | 2014/185505 A1 | | 11/2014 |

OTHER PUBLICATIONS

MedWOW: Manufacturer Specifications—H-2000B, Kokusan [online], [retrieved on Jun. 8, 2022], Retrieved from the internet: < URL: http://www.medwow.com/med/centrifuge/kokusan/h-2000b/33452.model-spec> (Year: 2022).*

Machine translation of JP 2014227525 A originally published Dec. 2014 to Banzashi et al. (Year: 2014).*

Office Action dated Jul. 27, 2021 from the China National Intellectual Property Administration in CN application No. 201880015071.5.

Office Action dated Jan. 6, 2022 in Chinese Application No. 201880015071.5.

Extended European Search Report dated Dec. 14, 2020, issued by the European Patent Office in European application No. 18760694.2.

Office Action dated Mar. 1, 2021, from the China National Intellectual Property Administration in Chinese application No. 201880015071.5.

Office Action dated Mar. 23, 2021, from the Korean Intellectual Property Office in Korean application No. 10-2019-7025949.

Office Action dated Sep. 27, 2021 in Korean Application No. 10-2019-7025949.

Office Action dated Nov. 30, 2021 from the Japanese Patent Office in Japanese Application No. 2017-244757.

Michiko Shimizu et al., "Bulky Quaternary Alkylammonium Counterions Enhance the Nanodispersibility of 2,2,6,6-Tetramethylpiperidine-1-oxyl-Oxidized Cellulose in Diverse Solvents", BioMacromolecules, 2014, vol. 15, No. 5, pp. 1904-1909 (6 pages total).

Office Action dated Apr. 14, 2021 from the Taiwanese Intellectual Property Office in TW Application No. 107106832.

International Search Report (ISR) and Written Opinion (WOP) dated May 1, 2018, issued by the International Searching Authority in corresponding application No. PCT/JP2018/007711.

International Preliminary Report on Patentability (IPRP) dated Sep. 12, 2019, issued by the International Bureau in corresponding application No. PCT/JP2018/007711.

Office Action dated May 23, 2022 issued by China National Intellectual Property Administration in Chinese Application No. 201880015071.5.

Office Action dated May 10, 2022 issued by the Japanese Patent Office in Japanese Application No. 2017-244757.

* cited by examiner

[Figure 1]
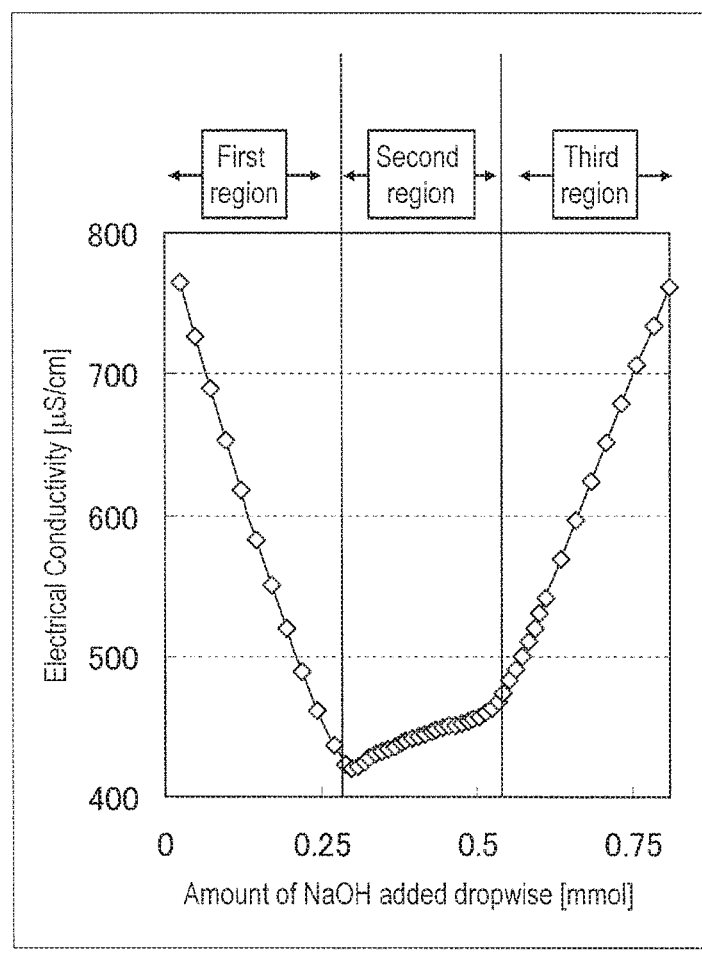

[Figure 2]
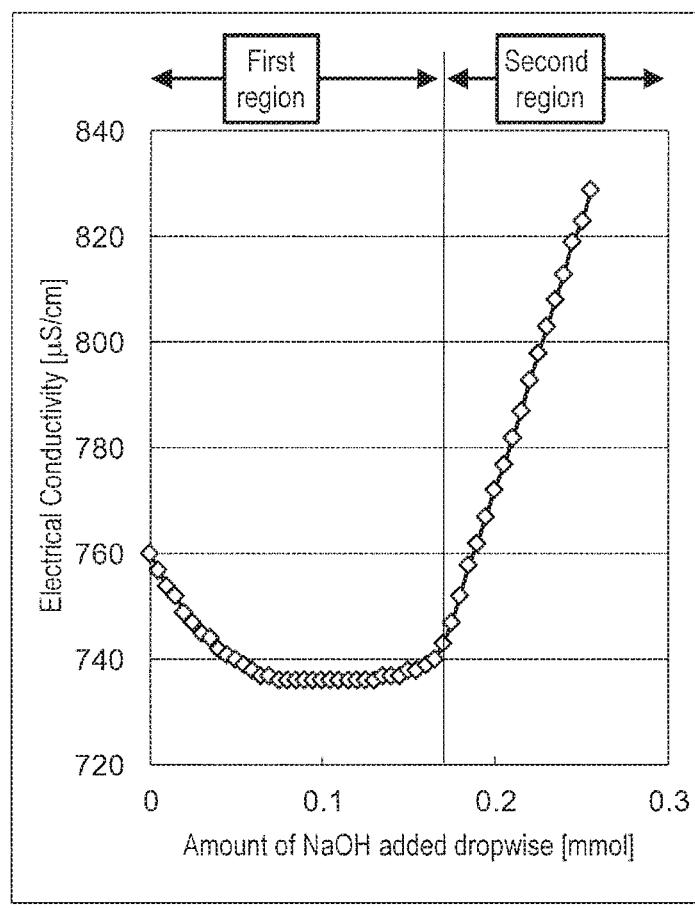

CELLULOSE FIBERS, CELLULOSE FIBER-CONTAINING COMPOSITION, CELLULOSE FIBER DISPERSION, AND METHOD FOR PRODUCING CELLULOSE FIBERS

CROSS REFERENCE TO RELATED APPLICATIONS

This application is a National Stage of International Application No. PCT/JP2018/007711 filed on Mar. 1, 2018, which claims priority from Japanese Patent Application No. 2017-038708 filed on Mar. 1, 2017, and Japanese Patent Application No. 2017-244757 filed on Dec. 21, 2017.

TECHNICAL FIELD

The present invention relates to cellulose fibers, a cellulose fiber-containing composition, a cellulose fiber dispersion, and a method for producing cellulose fibers. Specifically, the present invention relates to cellulose fibers having a fiber width of 1000 nm or less, a cellulose fiber-containing composition, a cellulose fiber dispersion, and a method for producing cellulose fibers having a fiber width of 1000 nm or less.

BACKGROUND ART

Conventionally, cellulose fibers have been broadly utilized in clothes, absorbent articles, paper products, and the like. As cellulose fibers, ultrafine cellulose fibers having a fiber diameter of 1 μm or less have been known, as well as cellulose fibers having a fiber diameter of 10 μm or more and 50 μm or less. Such ultrafine cellulose fibers have attracted attention as novel materials, and the intended use thereof has been highly diversified. For example, the development of sheets, resin composites, and thickeners comprising the ultrafine cellulose fibers has been promoted.

In general, since ultrafine cellulose fibers are stably dispersed in an aqueous solvent, the ultrafine cellulose fibers are provided in the form of an aqueous dispersion, and are frequently applied for various types of intended uses. On the other hand, it has also been desired to use ultrafine cellulose fibers in the form of a mixture with an organic solvent, when the ultrafine cellulose fibers are mixed with resin components to produce a composite and the like. As a technique that meets such a demand, a technique of producing an ultrafine cellulose fiber-containing dispersion, in which ultrafine cellulose fibers are dispersed in a dispersion medium containing an organic solvent, has been studied (Patent Documents 1 to 3).

For example, Patent Document 1 discloses an ultrafine cellulose fiber composite, in which surfactants are adsorbed on ultrafine cellulose fibers having carboxyl groups. In this publication, a method comprising aggregating ultrafine cellulose fibers, after fibrillation of cellulose fibers in an aqueous solvent, and then dispersing the resultant in an organic solvent, and a method of performing fibrillation on cellulose fibers in an organic solvent to obtain ultrafine cellulose fibers are disclosed. In addition, Patent Document 2 discloses a dispersion form comprising carboxyl group-introduced ultrafine cellulose fibers and an organic solvent, and also comprising organic onium ions as counterions. Patent Document 3 discloses a method for producing art ultrafine cellulose fiber dispersion, comprising a step of preparing an aqueous dispersion of ultrafine cellulose fibers having carboxylate-type groups, a step of substituting the carboxylate-type groups with carboxylic acid amine salt-type groups of amines having organic groups, and a step of dispersing the ultrafine cellulose fibers having the carboxylic acid amine salt-type groups in an organic solvent.

PRIOR ART DOCUMENTS

Patent Documents

Patent Document 1: Japanese Patent Publication-A-2011-140738
Patent Document 2: Japanese Patent Publication-A-2015-101694
Patent Document 3: Japanese Patent Publication-A-2012-021081

SUMMARY OF INVENTION

Object to be Solved by the Invention

In general, since the dielectric constant of an organic solvent is lower than that of water, it has been known that necessary electrostatic repulsion can be hardly obtained upon dispersion of ultrafine cellulose fibers in the organic solvent. Hence, it has tended that the dispersibility of ultrafine cellulose fibers becomes insufficient in an organic solvent.

Hence, in order to solve the aforementioned problem of the prior art technique, the present inventors have conducted studies for the purpose of providing ultrafine cellulose fibers capable of exhibiting favorable dispersibility even in an organic solvent.

Means for Solving the Object

As a result of intensive studies in order to achieve the aforementioned object, the present inventors have found that, in ultrafine cellulose fibers having phosphoric acid groups or phosphoric acid group-derived substituents, the content of the phosphoric acid groups or phosphoric acid group-derived substituents is set at 0.5 mmol/g or more, and further, the yield of the ultrafine cellulose fibers in the supernatant of an aqueous dispersion thereof is set within a predetermined range, so that ultrafine cellulose fibers capable of exhibiting favorable dispersibility even in an organic solvent can be obtained.

Specifically, the present invention has the following configuration.

[1] Cellulose fibers having a fiber width of 1000 nm or less and having phosphoric acid groups or phosphoric acid group-derived substituents, wherein
the content of the phosphoric acid groups or phosphoric acid group-derived substituents is 0.5 mmol/g or more, and
the supernatant yield measured by the following measurement method (a) is 70% or less;
measurement method (a):
an aqueous dispersion A of the cellulose fibers having a solid concentration of 0.5% by mass is prepared, a defibration treatment is then performed on the aqueous dispersion A using a defibration treatment device under conditions of 21500 rotations/minute for 30 minutes to obtain an aqueous dispersion B; subsequently, the aqueous dispersion B is converted to an aqueous dispersion C having a solid concentration of 0.2% by mass, which is then subjected to a centrifugation treatment under conditions of 12000 G and 15° C. for 10 minutes, and then, a supernatant is recovered; and the solid concentration in the recovered supernatant is measured, and a supernatant yield is then calculated according to the following equation:

Supernatant yield (%)=solid concentration (% by mass) in supernatant/0.2 (% by mass)×100.

[2] The cellulose fibers according to [1], comprising at least one selected from organic onium ions having hydrocarbon groups containing 5 or more carbon atoms, and organic onium ions having a total carbon number of 17 or more, as counterions of the phosphoric acid groups or the phosphoric acid group-derived substituents.

[3] The cellulose fibers according to [2], wherein the organic onium ions are organic ammonium.

[4] A cellulose fiber-containing composition comprising 85% by mass or more of the cellulose fibers according to any one of [1] to [3].

[5] A cellulose fiber-containing dispersion comprising the cellulose fibers according to any one of claims [1] to [3] and an organic solvent.

[6] The cellulose fiber-containing dispersion according to [5], wherein the dielectric constant of the organic solvent at 25° C. is 60 or less.

[7] A method for producing cellulose fibers, comprising:
subjecting cellulose fibers having 0.5 mmol/g or more of phosphoric acid groups or phosphoric acid group-derived substituents to a defibration treatment in an aqueous solvent, to obtain an aqueous dispersion comprising cellulose fibers having a fiber width of 1000 nm, or less; and
adding at least one selected from organic onium ions having hydrocarbon groups containing 5 or more carbon atoms, and organic onium ions having a total carbon number of 17 or more, to the aqueous dispersion.

Effects of Invention

According to the present invention, ultrafine cellulose fibers capable of exhibiting favorable dispersibility even in an organic solvent can be obtained.

BRIEF DESCRIPTION OF DRAWINGS

FIG. 1 is a graph showing the relationship between the amount of NaOH added dropwise to a fiber raw material having a phosphoric acid group and the electrical conductivity.

FIG. 2 is a graph showing the relationship between the amount of NaOH added dropwise to a fiber raw material having a carboxyl group and the electrical conductivity.

EMBODIMENTS OF CARRYING OUT THE INVENTION

Hereinafter, the present invention will be described in detail. The description for components described below will be based on representative embodiments or specific examples; however, the present invention will not be limited to such embodiments.

(Cellulose Fibers)

The present invention relates to cellulose fibers having a fiber width of 1000 nm or less and having phosphoric acid groups or phosphoric acid group-derived substituents. Herein, the content of the phosphoric acid groups or phosphoric acid group-derived substituents is 0.5 mmol/g or more. In addition, the supernatant yield measured by the following measurement method (a) is 70% or less.

Measurement Method (a):

An aqueous dispersion A of cellulose fibers having a solid concentration of 0.5% by mass is prepared, and a defibration treatment is then performed on the aqueous dispersion A using a defibration treatment device under conditions of 21500 rotations/minute for 30 minutes to obtain an aqueous dispersion B. Subsequently, the aqueous dispersion B is converted to an aqueous dispersion C having a solid concentration of 0.2% by mass, which is then subjected to a centriftigation treatment under conditions of 12000 G and 15° C. for 10 minutes, and then, a supernatant is recovered. The solid concentration in the recovered supernatant is measured, and a supernatant yield is then calculated according to the following equation:

Supernatant yield (%)=solid concentration (% by mass) in supernatant/0.2 (% by mass)×100.

Since the cellulose fibers of the present invention have the above-described configuration, the present cellulose fibers can exhibit favorable dispersibility even in organic solvent. Specifically, a dispersion obtained by dispersing the cellulose fibers of the present invention in an organic solvent has high viscosity. In the present description, the dispersibility of a dispersion obtained by dispersing cellulose fibers in an organic solvent can be determined based on the viscosity of the dispersion.

It is to be noted that, in the present description, cellulose fibers having a fiber width of 1000 nm or less are also referred to as ultrafine cellulose fibers.

The supernatant yield measured by the above-described measurement method (a) that is 70% or less means that the ultrafine cellulose fibers of the present invention have a certain extent of hydrophobicity. In the present invention, it is considered that cellulose fibers have hydrophobicity, so that the cellulose fibers can exhibit favorable dispersibility in an organic solvent. The supernatant yield measured by the above-described measurement method (a) may be 70% or less, preferably 50% or less, more preferably 30% or less, and further preferably 25% or less.

In the measurement method (a), first, an aqueous dispersion A of ultratine cellulose fibers having a solid concentration of 0.5% by mass is prepared. Herein, the solid concentration means the concentration of the ultrafine cellulose fibers, and 0.5% by mass of the ultrafine cellulose fibers are comprised in the aqueous dispersion A. Then, a defibration treatment is performed on the aqueous dispersion A using a defibration treatment device under conditions of 21500 rotations/minute for 30 minutes to obtain an aqueous dispersion B. In the defibration treatment, as a defibration treatment device, for example, a high-speed rotation defibration treatment device is preferably used. Specifically, CLEARMIX-2.25 manufactured by M Technique Co., Ltd. can be used. Subsequently, ion exchange water is added to the aqueous dispersion B to obtain an aqueous dispersion C having a solid concentration of 0.2% by mass, which is then subjected to a centrifugation treatment under conditions of 12000 G and 15° C. for 10 minutes, and a supernatant is then recovered. In the centrifugation treatment step, a high-speed cooling centrifuge is preferably used. Specifically, H-2000B manufactured by KOKUSAN Co. Ltd. can be used. Thereafter, the solid concentration in the recovered supernatant is measured, and a supernatant yield is then calculated according to the above equation.

The ultrafine cellulose fibers of the present invention have sufficient dispersibility in an organic solvent, and such dispersibility can be exhibited even in an organic solvent having a low dielectric constant. The organic solvent used as a dispersion medium is not particularly limited, but examples of the organic solvent may include methanol (dielectric constant: 32.6), ethanol (dielectric constant: 24.3), n-propyl alcohol (dielectric constant: 20.1), isopropyl alcohol (IPA) (dielectric constant: 18.62), 1-butanol (dielectric constant: 18), m-cresol (dielectric constant: 11.8), glycerin (dielectric constant: 42.5), acetic acid (dielectric constant: 6.15), pyridine (dielectric constant: 12.3), tetrahydrofuran (THF) (dielectric constant: 7.5), acetone (dielectric constant: 20.7), methyl ethyl ketone (MEK) (dielectric constant: 15.45), ethyl acetate (dielectric constant: 6.4), aniline (dielectric constant: 6.89), N-methyl-2-pyrrolidone (NMP) (dielectric constant: 32.2), dimethyl sulfoxide (DMSO) (dielectric constant: 45), N,N-dimethylformamide (DMF) (dielectric constant: 38), hexane (dielectric constant: 1.8), cyclohexane (dielectric constant: 2.0), benzene (dielectric constant: 2.3), toluene (dielectric constant: 2.4), p-xylene (dielectric constant: 2.3), diethyl ether (dielectric constant: 4.3), chloroform (dielectric constant: 4.8), and 2-pyrrolidinone (dielectric constant: 28.2). Among these, N-methyl-2-pyrrolidone (NMP), dimethyl sulfoxide (DMSO), N,N-dimethylformamide (DMF), toluene, p-xylene, methanol, and 2-pyrrolidinone are preferably used.

The viscosity of a dispersion obtained by dispersing ultrafine cellulose fibers in an organic solvent depends on the type of the organic solvent and the concentration of the ultrafine cellulose fibers in the dispersion. For example, when the concentration of the ultrafine cellulose fibers in the dispersion is 2.0% by mass, in a case where the organic solvent is dimethyl sulfoxide (DMSO), the viscosity of the dispersion is preferably 8000 mPa·s or more, more preferably 10000 mPa·s or more, even more preferably 30000 mPa·s or more, and further preferably 50000 mPa·s or more. Moreover, in a case where the organic solvent is N,N-dimethylformamide (DMF), the viscosity of the dispersion is preferably 500 mPa·s or more, and more preferably 1000 mPa·s or more. In a case where the organic solvent is N-methyl-2-pyrrolidone (NMP), the viscosity of the dispersion is preferably 1500 mPa·s or more, and more preferably 2000 mPa·s or more. In a case where the organic solvent is toluene, the viscosity of the dispersion is preferably 50 mPa·s or more, and more preferably 53 mPa·s or more. Furthermore, in a case where the organic solvent is p-xylene, the viscosity of the dispersion is preferably 100 mPa·s or more, and inure preferably 200 mPa·s or more. In a case where the organic solvent is methanol, the viscosity of the dispersion is preferably 8000 mPa·s or more, more preferably 10000 mPa·s or more, and further preferably 20000 mPa·s or more. In a case where the organic solvent is 2-pyrrolidinone, the viscosity of the dispersion is preferably 10000 mPa·s or more, more preferably 30000 mPa·s or more, and further preferably 50000 mPa·s or more.

When the viscosity of a dispersion obtained by dispersing ultrafine cellulose fibers in an organic solvent is measured, ultrafine cellulose fibers are dispersed in an organic solvent to result in a solid concentration of 2.0% by mass, so as to obtain an ultrafine cellulose fiber-containing slurry, and the obtained slurry is then left at rest at 25° C. for 24 hours. Thereafter, the viscosity of the resulting slurry is measured using a type B viscometer. As such a type B viscometer, for example, an analog viscometer T-LVT manufactured by BROOKFIELD can be used. Regarding measurement conditions, the slurry is rotated at 25° C. at 6 rpm for 3 minutes, and the viscosity thereof is then measured.

In order to achieve favorable dispersibility in an organic solvent, the ultrafine cellulose fibers of the present invention are characterized in that they do not generate precipitates in a dispersion. Thus, the viscosity of a dispersion obtained by dispersing ultrafine cellulose fibers in an organic solvent can be set within the above-described range. Moreover, since the ultrafine cellulose fibers of the present invention have favorable dispersibility in an organic solvent, the energy necessary upon dispersing the ultrafine cellulose fibers in an organic solvent can be reduced.

The total light transmittance of a dispersion obtained by dispersing ultrafine cellulose fibers in an organic solvent is, when the concentration of the ultrafine cellulose fibers in the dispersion is 2.0% by mass, preferably 50% or more, more preferably 55% or more, even more preferably 65% or more, further preferably 70% or more, still further preferably 80% or more, and particularly preferably 85% or more.

When the total light transmittance of a dispersion obtained by dispersing ultrafine cellulose fibers in an organic solvent is measured, ultrafine cellulose fibers are dispersed in an organic solvent to result in a solid concentration of 2.0% by mass, so as to obtain an ultrafine cellulose fiber-containing shiny, and the total light transmittance of the obtained slurry is then measured. The total light transmittance is measured using a haze meter (manufactured by MURAKAMI COLOR RESEARCH LABORATORY Co., Ltd., HM-150) and a glass cell for liquid having an optical path length of 1 cm (manufactured by Fujiwara Scientific Company Co., Ltd., MG-40, inverse optical path), in accordance with JIS K 7361. It is to be noted that the measurement of zero point is carried out with ion exchange water filled in the same glass cell as that described above.

The solid concentration before dispersion of the ultrafine cellulose fibers of the present invention in an organic solvent is preferably 70% by mass or more, more preferably 80% by mass or more, and further preferably 85% by mass or more. The ultrafine cellulose fibers of the present invention are characterized in that they have a low content of water. Thus, the amount of water in a dispersion obtained by dispersing the ultrafine cellulose fibers of the present invention in an organic solvent is suppressed.

The ultrafine cellulose fibers of the present invention comprise, for example, at least one selected from organic onium ions having hydrocarbon groups containing 5 or more carbon atoms, and organic onium ions having a total carbon number of 17 or more, as counterions of the phosphoric acid groups or the phosphoric acid group-derived substituents.

The hydrocarbon group having 5 or more carbon atoms is preferably an alkyl group having 5 or more carbon atoms or an alkylene group having 5 or more carbon atoms, more preferably an alkyl group having 7 or more carbon atoms or an alkylene group having 7 or more carbon atoms, and farther preferably an alkyl group having 10 or snore carbon atoms or an alkylene group having 10 or more carbon atoms. Among others, organic onium ions having alkyl groups containing 5 or more carbon atoms are preferable, and organic onium ions having alkyl groups containing 5 or more carbon atoms and also having a total carbon number of 17 or more are more preferable.

The organic onium ion having hydrocarbon groups containing 5 or more carbon atoms, and the organic onium ion having a total carbon number of 17 or more are each preferably an organic onium ion represented by the following formula (A).

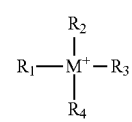

Formula (A)

In the above formula (A), M represents a nitrogen atom or a phosphorus atom, and $R_1$ to $R_4$ each independently represent a hydrogen atom or an organic group. However, at least one of $R_1$ to $R_4$ represents an organic group containing 5 or more carbon atoms, or the total number of carbon atoms contained in $R_1$ to $R_4$ is 17 or more.

Among others, M is preferably a nitrogen atom. Specifically, the organic onium ion is organic ammonium. Moreover, preferably; at least one of $R_1$ to $R_4$ is an alkyl group containing 5 or more carbon atoms, and the total number of carbon atoms contained in $R_1$ to $R_4$ is 17 or more. The alkyl group containing 5 or more carbon atoms may optionally have a substituent.

Examples of such an organic onium ion may include tetrapentyl ammonium, tetrahexyl ammonium, tetraheptyl ammonium, lauryltrimethyl ammonium, cetyltrimethyl ammonium, stearyltrimethyl ammonium, octyldimethylethyl ammonium, lauryldimethylethyl ammonium, didecyldimethyl ammonium, lauryldimethylbenzyl ammonium, tributylbenzyl ammonium, methyltri-n-ocyl ammonium, hexyl ammonium, n-octyl ammonium, dodecyl ammonium, tetradecyl ammonium, hexadecyl ammonium, stearyl ammonium, N,N-dimethyldodecyl ammonium, N,N-dimethyltetradecyl ammonium, N,N-dimethylhexadecyl ammonium, N,N-dimethyl-n-octadecyl ammonium, dihexyl ammonium, di(2-ethylhexyl) ammonium, di-n-octyl ammonium, didecyl ammonium, didodecyl ammonium, didecyldimethyl ammonium, N,N-didodecylmethyl ammonium, polyoxyethylene dodecyl ammonium, alkyldimethylbenzyl ammonium, di-n-alkyldimethyl ammonium, behenyltrimethyl ammonium, tetraphenyl phosphonium, tetraoctyl phosphonium, acetonyltriphenyl phosphonium, allyltriphenyl phosphonium, amyltriphenyl phosphonium, benzyltriphenyl phosphonium, and ethyltriphenyl phosphonium.

Besides, as shown in the formula (A), the center element of the organic onium ion binds to a total of 4 groups or hydrogen atoms. When the aforementioned organic onium ion, the center element of which binds to less than 4 groups, hydrogen atom(s) bind to the rest(s), so as to farm an organic onium ion(s). For example, in the case of N,N-didodecylmethyl ammonium, it can be determined from the name thereof that two dodecyl groups and one methyl group bind thereto. In this case, a hydrogen atom binds to the remaining one to form an organic onium ion.

The molecular weight of the organic onium ion is preferably 2000 or less, and more preferably 1800 or less. By setting the molecular weight of the organic onium ion within the above-described range, the handling ability of the ultrafine cellulose fibers can be enhanced. In addition, as a whole, a decrease in the content rate of cellulose can be suppressed.

The content of the organic onium ions in the ultrafine cellulose fibers of the present invention is preferably an amount that is equimolar to or is 2 times the molar amount of phosphoric acid groups contained in the ultrafine cellulose fibers, but is not particularly limited thereto. The content of the organic onium ions can be measured by tracking atoms typically contained in the organic onium ions. Specifically, when the organic onium ions are ammonium ions, the amount of nitrogen atoms is measured, and when the organic onium ions are phosphonium ions, the amount of phosphorus atoms is measured. When the ultrafine cellulose fibers comprise nitrogen atoms or phosphorus atoms, as well as the organic onium ions, a method of extracting only the organic onium ions, for example, an extraction operation using acid, etc. may be earned out, and thereafter, the amount of atoms of interest may be measured.

The ultrafine cellulose fibers of the present invention may comprise metal ions as counterions. Otherwise, the ultrafine cellulose fibers of the present invention may not comprise metal ions as counterions. When the ultrafine cellulose fibers comprise metal ions as counterions, examples of the metal ions may include sodium ions, potassium ions, calcium ions, magnesium ions, and aluminum ions.

When the total electric charge of phosphoric acid groups represented by the following equation (a) is defined as Ea, and the total electric charge of sodium ions, potassium ions, calcium ions, magnesium ions and aluminum ions represented by the following equation (b) is defined as Eb, it is preferable to satisfy the conditions of Eb<Ea×0.1 in some cases. On the other hand, it may also be adequate even if Eb≥Ea×0.1.

Ea=Amount of phosphoric acid groups (mmol/g)× valence of phosphoric acid groups.　　　Equation (a):

Eb=(Content of sodium ions (mmol/g)×valence of sodium ions (monovalent))+(content of potassium ions (mmol/g)×valence of potassium ions (monovalent))+(content of calcium ions (mmol/g)×valence of calcium ions (divalent))+(content of magnesium ions (mmol/g)×valence of magnesium ions (divalent))+(content of aluminum ions (mmol/g)×valence of aluminum ions (trivalent)).　　　Equation (b):

The raw material of cellulose fibers for obtaining ultrafine cellulose fibers is not particularly limited, but pulp is preferably used from the viewpoint of availability and inexpensiveness. Examples of the pulp include wood pulp, non-wood pulp, and deinked pulp. Examples of the wood pulp include chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semi-chemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp include, but are not particularly limited to, cotton pulps such as cotton linter and cotton lint; non-wood type pulps such as hemp, wheat straw, and bagasse; and cellulose isolated from ascidian, seaweed, etc., chitin, and chitosan. As a deinked pulp, there is deinked pulp using waste paper as a raw material, but it is not particularly limited thereto. The pulp of the present embodiment may be used singly; or in combination of two or more types. Among the above-listed pulp types, wood pulp and deinked pulp including cellulose are preferable from the viewpoint of easy availability. Among wood pulps, chemical pulp is preferable because it has a higher cellulose content to enhance the yield of the ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected.

The average fiber width of the ultrafine cellulose fibers is 1000 nm or less according to observation with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of the ultrafine cellulose fibers is less than 2 nm, since they are dissolved in water as cellulose molecules, there appears tendency that the physical properties (strength, rigidity, and dimensional stability) as an ultrafine cellulose fiber are not expressed sufficiently. The ultrafine cellulose fiber is, for example, monofilament cellulose having a fiber width of 1000 nm or less.

The measurement of a fiber width of an ultrafine cellulose fiber by electron microscopic observation is carried out as follows. An aqueous suspension of the ultrafine cellulose fibers having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width (which is simply referred to as a "fiber width" at times) of the ultrafine cellulose fibers is an average value of the fiber widths thus read.

The fiber length of the ultrafine cellulose fibers is not particularly limited, and it is preferably 0.1 μm or more and 1000 μm or less, more preferably 0.1 μm or more and 800 μm or less, and particularly preferably 0.1 μm or more and 600 μm or less. By setting the fiber length within the above-described range, destruction of the crystalline region of the ultrafine cellulose fibers can be suppressed, and the slurry viscosity of the ultrafine cellulose fibers can also be set within an appropriate range. It is to be noted that the fiber length of the ultrafine cellulose fibers can be obtained by an image analysis using TEM, SEM or AFM.

The ultrafine cellulose fibers preferably have a type I crystal structure. In this regard, the fact that the ultrafine cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=14° or more and 17° or less, and near 2θ=22° or more and 23° or less.

The percentage of the type I crystal structure occupied in the ultrafine cellulose fibers is preferably 30% or more, more preferably 50% or more, and further preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

The ultrafine cellulose fibers have phosphoric acid groups or phosphoric acid group-derived substituents (which are simply referred to as "phosphoric acid groups" at times). That is to say, the ultrafine cellulose fibers of the present invention are phosphorylated cellulose. The phosphoric acid group is a divalent functional group corresponding to phosphoric acid from which hydroxyl groups are removed. Specifically, it is a group represented by —PO₃H₂. The phosphoric acid group-derived substituents include substituents, such as condensation-polymerized phosphoric acid groups, salts of phosphoric acid groups, and phosphoric acid ester groups, and they may be either ionic substituents or nonionic substituents.

In the present invention, the phosphoric acid group or the phosphoric acid group-derived substituent may be a substituent represented by the following formula (1):

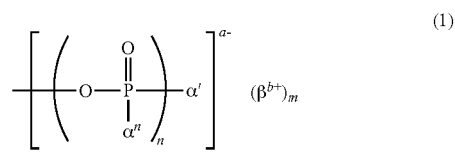

In the Formula (1), a, b, and n each represent a natural number (provided that a=b×m); an "a" number of $\alpha^1$, $\alpha^2$, ..., $\alpha^n$ and $\alpha'$ is and the rest are either R or OR. All of $\alpha^n$ and $\alpha'$ may also be R each represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an unsaturated cyclic hydrocarbon group, an aromatic group, or a derivative group thereof.

Examples of the saturated straight chain hydrocarbon group include a methyl group, an ethyl group, an n-propyl group, and an n-butyl group, but are not particularly limited thereto. Examples of the saturated branched chain hydrocarbon group include an i-propyl group and a t-butyl group, but are not particularly limited thereto. Examples of the saturated cyclic hydrocarbon group include a cyclopentyl group and a cyclohexyl group, but are not particularly limited thereto. Examples of the unsaturated straight chain hydrocarbon group include a vinyl group and an allyl group, but are not particularly limited thereto. Examples of the unsaturated branched chain hydrocarbon group include an i-propenyl group and a 3-butenyl group, but are not particularly limited thereto. Examples of the unsaturated cyclic hydrocarbon group include a cyclopentenyl group and a cyclohexenyl group, but are not particularly limited thereto. Examples of the aromatic group include a phenyl group and a naphthyl group, but are not particularly limited thereto.

Moreover, examples of the derivative group of the R include functional groups such as a carboxyl group, a hydroxyl group or an amino group, in which at least one type selected from the functional groups is added to or substituted with the main chain or side chain of the above-described various types of hydrocarbon groups, but are not particularly limited thereto. Furthermore, the number of carbon atoms constituting the main chain of the above-described R is not particularly limited, but it is preferably 20 or less, and more preferably 10 or less. By setting the number of carbon atoms constituting the main chain of the R within the above-described range, the molecular weight of phosphoric acid groups can be adjusted in a suitable range, permeation thereof into a fiber raw material can be facilitated, and the yield of the ultrafine cellulose fibers can also be enhanced.

$\beta^{b+}$ is a mono- or more-valent cation consisting of an organic or inorganic matter. Examples of the mono- or more-valent cation consisting of an organic matter include an aliphatic ammonium and an aromatic ammonium, and examples of the mono- or more-valent cation consisting of an inorganic matter include alkali metal ions such as sodium, potassium or lithium ions, divalent metal cations such as calcium or magnesium ions, and hydrogen ions, but are not particularly limited thereto. These can be applied alone as a single type or in combination of two or more types. As such mono- or more-valent cations consisting of an organic or inorganic matter, sodium or potassium ions, which hardly cause the yellowing of a fiber raw material containing β upon heating and are industrially easily applicable, are preferable, but are not particularly limited thereto.

<Phosphoric Acid Group Introduction Step>

The phosphoric acid group introduction step may be performed by allowing at least one selected from a compound having phosphoric acid groups and salts thereof (hereinafter, referred to as a "phosphorylating reagent" or "Compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into a slurry of the fiber raw material.

The phosphoric acid group introduction step may be performed by allowing at least one selected from a compound having phosphoric acid groups and salts thereof (a phosphorylating reagent or Compound A) to react with the fiber raw material including cellulose. It is to be noted that this reaction may be performed in the presence of at least one selected from urea and derivatives thereof (hereinafter, referred to as "Compound B").

One example of the method of allowing Compound A to act on the fiber raw material in the presence of Compound B includes a method of mixing the fiber raw material in a dry or wet state with a powder or an aqueous solution of Compound A and Compound B. Another example thereof includes a method of adding a powder or an aqueous solution of Compound A and Compound B to a slurry of the fiber raw material. Among them, a method of adding an aqueous solution of Compound A and Compound B to the fiber raw material in a dry state, or a method of adding a powder or an aqueous solution of Compound A and Compound B to the fiber raw material in a wet state is preferable because of the high homogeneity of the reaction. Compound A and Compound B may be added at the same time or may be added separately. Alternatively, Compound A and Compound B to be subjected to the reaction may be first added as an aqueous solution, which may be then compressed to squeeze out redundant chemicals. The form of the fiber raw material is preferably a cotton-like or thin sheet form, but the form is not particularly limited thereto.

The Compound A used in the present embodiment is at least one selected from a compound having a phosphoric acid group and a salt thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferable. Sodium dihydrogen phosphate, or disodium hydrogen phosphate is more preferable.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably pH 7 or less because the efficiency in introduction of a phosphoric acid group is high, and more preferably pH 3 or more and pH 7 or less from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the amount ratio thereof. The pH of an aqueous solution of Compound A may also be adjusted by adding an inorganic alkali or an organic alkali to an acidic compound among compounds having a phosphoric acid group.

Although the amount of the Compound A added to a fiber raw material is not particularly limited, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and most preferably 2% by mass or more and 30% by mass or less. When the amount of phosphorus atoms added to the fiber raw material is within the above-described range, the yield of the ultrafine cellulose fibers can be further improved. If the amount of phosphorus atoms added to the fiber raw material exceeds 100% by mass, the effect of improving the yield has reached the ceiling and the cost of the used Compound A increases. On the other hand, by setting the amount of phosphorus atoms added to the fiber raw material to be the above-described lower limit or more, the yield can be enhanced.

Examples of the Compound B used in the present embodiment include urea, biuret, 1-phenyl urea, 1-benzyl urea, 1-methyl urea, and 1-ethyl urea.

The Compound B is preferably used as an aqueous solution, as with the Compound A. Further, an aqueous solution in which both the Compound A and Compound B are dissolved is preferably used, because the uniformity of a reaction may be enhanced. The amount of the Compound B added to a fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may comprise an amide or an amine, in addition to the Compound A and the Compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferable to perform a heat treatment. For the temperature of such a heat treatment, it is preferable to select a temperature that allows an efficient introduction of phosphoric acid groups, while suppressing the thermal decomposition or hydrolysis reaction of fibers. Specifically, the temperature is preferably 50° C. or higher and 300° C. or lower, more preferably 100° C. or higher and 250° C. or lower, and further preferably 150° C. or higher and 200° C. or lower. In addition, a vacuum dryer, an infrared heating device, or a microwave heating device may be used for heating.

Upon the heat treatment, if the time for leaving the fiber raw material to stand still gets longer while the fiber raw material slurry to which the Compound A is added contains water, as drying advances, water molecules and the Compound A dissolved therein move to the surface of the fiber raw material. As such, there is a possibility of the occurrence of unevenness in the concentration of the Compound A in the fiber raw material, and the introduction of phosphoric acid groups to the fiber surface may not progress uniformly. In order to suppress the occurrence of unevenness in the concentration of the Compound A in the fiber raw material due to drying, the fiber raw material in the shape of a very thin sheet may be used, or a method of heat-drying or vacuum-drying the fiber raw material, while kneading or stirring with the Compound A using a kneader or the like, may be employed.

As a heating device used for heat treatment, a device capable of always discharging moisture retained by slurry or moisture generated by an addition reaction of phosphoric acid groups with hydroxy groups of the fiber to the outside of the device system is preferable, and for example, forced convection ovens or the like are preferable. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less, after moisture is substantially removed from the fiber raw material slurry. In the present invention, by setting the heating temperature and heating time within an appropriate range, the amount of phosphoric acid groups introduced can be set within a preferred range.

The content of phosphoric acid groups (the amount of phosphoric acid groups introduced) may be, per 1 g (mass) of the ultrafine cellulose fibers, 0.50 mmol/g or more, preferably 0.70 mmol/g or more, and more preferably 0.90 mmol/g or more. On the other hand, the content of phosphoric acid groups may be, per 1 g (mass) of the ultrafine cellulose fibers, 4.00 mmol/g or less, preferably 3.65 mmol/g or less, more preferably 3.50 mmol/g or less, and further preferably 3.00 mmol/g or less. By setting the content of phosphoric acid groups within the above-described range, it may become easy to perform fibrillation on the fiber raw material, and the stability of the ultrafine cellulose fibers can be enhanced. In addition, by setting the content of phosphoric acid groups within the above-described range, the content of the aforementioned organic onium ions serving as counterions of the phosphoric acid groups can be increased, and thus, the dispersibility of the ultrafine cellulose fibers in an organic solvent can be more effectively enhanced. Besides, in the present description, the content of phosphoric acid groups in the ultrafine cellulose fibers (the amount of phosphoric acid introduced) is equal to the amount of strongly acidic groups of phosphoric acid groups in the ultrafine cellulose fibers, as described later.

The amount of phosphoric acid groups introduced into a fiber raw material may be measured by a conductometric titration method. Specifically, the amount introduced may be measured by performing fibrillation on ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. The boundary point between the second region and the third region is defined as a point at which a change amount in the two differential values of conductivity, namely, an increase in the conductivity (inclination) becomes maximum. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. That is to say, the amount (mmol) of the alkali required for the first region in the curve shown in FIG. 1 is divided by the solid content (g) in the slurry as a titration target to obtain the amount (mmol/g) of the substituent introduced.

The phosphoric acid group introduction step may be performed at least once, but may be repeated multiple times as well. This case is preferable, since more phosphoric acid groups are introduced.

<Defibration Treatment Step>

The phosphoric acid group-introduced fibers are subjected to a defibration treatment in a defibration treatment step. In the defibration treatment step, fibers are defibrated usually using a defibration treatment apparatus to yield a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may also be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and are free from apprehension of contamination.

Upon the defibration treatment, the fiber raw material is preferably diluted with water and an organic solvent each alone or in combination, to prepare a slurry, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

In the present invention, after the ultrafine cellulose fibers have been concentrated and dried, a defibration treatment may be carried out thereon. In this ease, there is no particular restriction on the method of concentration and drying, but examples thereof include a method in which a concentrating agent is added into a slurry comprising the ultrafine cellulose fibers, and a method using a dehydrator, a press, a dryer, and the like used generally. Further, publicly known methods, for example as described in WO 2014/024876, WO 2012/107642, and WO 2013/121086, may be used. Moreover, a sheet may be formed from the concentrated ultrafine cellulose fibers. The formed sheet may be pulverized and may be subjected to a defibration treatment.

Examples of a device used for pulverizing the ultrafine cellulose fibers include, but are not particularly limited to, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, and a device for wet milling, such as a high-speed rotating homomixer, an ultrasonic disperser, or a beater.

<Aggregation Step>

In the aggregation step, the aforementioned organic onium ions, or compounds that form organic onium ions as a result of neutralization, are added to the ultrafine cellulose fiber-containing slurry obtained in the defibration treatment step. At this time, organic onium ions are preferably added in the form of an aqueous solution containing the organic onium ions.

The aqueous solution containing the organic onium ions generally contains organic onium ions and counterions (anions). Upon preparation of such an aqueous solution containing the organic onium ions, if the organic onium ions and the corresponding counterions have already formed salts, they may be directly dissolved in water. In addition, there may also be a case where some organic onium ions are generated only after neutralization with acid, as in the case of dodecylamine. That is to say, organic onium ions may also be obtained by a reaction of a compound forming the organic onium ions as a result of neutralization, with acid. In this case, examples of the acid used in neutralization may include: inorganic acids such as hydrochloric acid, sulfuric acid and nitric acid; and organic acids such as lactic acid, formic acid and oxalic acid. In the aggregation step, it may be adequate if a compound funning organic onium as a result of neutralization is directly added into an ultrafine cellulose fiber-containing slurry, so that the compound may be converted to organic onium ions as counterions of the phosphoric acid groups comprised in the ultrafine cellulose fibers.

The additive amount of the organic onium ions is preferably 2% by mass or more, more preferably 10% by mass or more, further preferably 50% by mass or more, and particularly preferably 100% by mass or more, with respect to the total mass of the ultrafine cellulose fibers. On the other hand, the additive amount of the organic onium ions is preferably 1000% by mass or less with respect to the total mass of the ultrafine cellulose fibers.

Moreover, the number of moles of the organic onium ions to be added is preferably 0.2 times or more, more preferably 1.0 time or more, and further preferably 2.0 times or more the value obtained by multiplying the amount of substituents comprised in the ultrafine cellulose fibers (the number of moles) and the valence. On the other hand, the number of moles of the organic onium ions to be added is preferably 10 times or less the value obtained by multiplying the amount of substituents comprised in the ultrafine cellulose fibers (the number of moles) and the valence.

When the organic onium ions are added to the ultrafine cellulose fiber-containing slurry, followed by stirring, an aggregate is generated in the ultrafine cellulose fiber-containing slurry. This aggregate is obtained as a result of aggregation of the ultrafine cellulose fibers having organic onium ions as counterions. The ultrafine cellulose fiber-containing slurry, in which an aggregate is generated, is subjected to vacuum filtration, so as to recover an ultrafine cellulose fiber aggregate.

The obtained ultrafine cellulose fiber aggregate may be washed with ion exchange water. By repeatedly washing the ultrafine cellulose fiber aggregate with ion exchange water, redundant organic onium ions and the like comprised in the ultrafine cellulose fiber aggregate can be removed.

<Alkali Treatment>

When the ultrafine cellulose fibers are produced, an alkali treatment may be conducted between a phosphoric acid group introduction step and a defibration treatment step described, below. The method of the alkali treatment is not particularly limited, and for example, a method of immersing phosphoric acid group-introduced fibers in an alkaline solution may be applied.

The alkali compound contained in the alkaline solution is not particularly limited, and it may be either an inorganic alkaline compound or an organic alkali compound. The solvent of the alkaline solution may be either water or an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is particularly preferable, because of high versatility.

The temperature of the alkali solution in the alkali treatment step is not particularly limited, but it is preferably 5° C. or higher and 80° C. or lower, and more preferably 10° C. or higher and 60° C. or lower.

The immersion time in the alkali solution in the alkali treatment step is not particularly limited, but it is preferably 5 minutes or more and 30 minutes or less, and more preferably 10 minutes or more and 20 minutes or less.

The amount of the alkali solution used in the alkali treatment is not particularly limited, but it is preferably 100% by mass or more and 100000% by mass or less, and more preferably 1000% by mass and 10000% by mass or less, with respect to the absolute dry mass of the phosphoric acid group-introduced fibers.

In order to reduce the amount of an alkaline solution used in the alkali treatment step, phosphoric acid group-introduced fibers may be washed with water or an organic solvent before the alkali treatment step. After the alkali treatment, the alkali-treated phosphoric acid group-introduced fibers are preferably washed with water or an organic solvent before the defibration treatment step in order to improve the handling property.

(Cellulose Fiber-Containing Composition)

The present invention also relates to a cellulose fiber-containing composition comprising 85% by mass or more of the aforementioned ultrafine cellulose fibers. Herein, the content of the ultrafine cellulose fibers in the cellulose fiber-containing composition is calculated according to the following equation.

Content of ultrafine cellulose fibers (% by mass)= absolute dry mass of ultrafine cellulose fibers (mass of ultrafine cellulose fibers+mass of solvent)×100

The shape of the cellulose fiber-containing composition of the present invention is not particularly limited. For example, the present cellulose fiber-containing composition may have a solid-like or gelatinous shape. The cellulose fiber-containing composition may not comprise water, but may comprise it. When the cellulose fiber-containing composition is used for water-repellent purpose, it is preferable for the composition not to comprise water. When the cellulose fiber-containing composition comprises water, the water content is not particularly limited. The water content is, for example, 15% by mass or less, and more preferably 12% by mass or less, with respect to the total mass of the ultrafine cellulose fiber-containing composition. On the other hand, the water content may be 0.1% by mass or more, may also be 0.3% by mass or more, or may also be 0.5% by mass or more.

(Cellulose Fiber-Containing Dispersion)

The present invention may also relate to a cellulose fiber-containing dispersion comprising: the aforementioned ultrafine cellulose fibers and an organic solvent. The cellulose fiber-containing dispersion of the present invention is a cellulose fiber-containing dispersion, in which the aforementioned ultrafine cellulose fibers or ultrafine cellulose fiber-containing compositions are dispersed in a dispersion medium containing an organic solvent. Besides, the cellulose fiber-containing dispersion of the present invention may further comprise water as a dispersion, medium, in addition to an organic solvent.

When the cellulose fiber-containing composition of the present invention comprises an organic solvent, the dielectric constant of the organic solvent at 25° C. is preferably 60 or less, and more preferably 50 or less. Since the ultrafine cellulose fibers of the present invention can exhibit excellent dispersibility even in an organic solvent having a low dielectric constant, the dielectric constant of the organic solvent at 25° C. may be 45 or less, may also be 40 or less, or may also be 35 or less.

The $\delta p$ of the Hansen solubility parameter (HSP) of the organic solvent, is preferably 5 $MPa^{1/2}$ or more and 20 $MPa^{1/2}$ or less, more preferably 10 $MPa^{1/2}$ or more and 19 $MPa^{1/2}$ or less, and further preferably 12 $MPa^{1/2}$ or more and 18 $MPa^{1/2}$ or less. In addition, the $\delta h$ is preferably 5 $MPa^{1/2}$ or more and 40 $MPa^{1/2}$ or less, more preferably 5 $MPa^{1/2}$ or more and 30 $MPa^{1/2}$ or less, and further preferably 5 $MPa^{1/2}$ or more and 20 $MPa^{1/2}$ or less. Moreover, it is also preferable to simultaneously satisfy both the $\delta p$ value that is in the range of 0 $MPa^{1/2}$ or more and 4 $MPa^{1/2}$ or less, and the $\delta h$ value that is in the range of 0 $MPa^{1/2}$ or more and 6 $MPa^{1/2}$ or less.

The water content is preferably low in the cellulose fiber-containing dispersion of the present invention. The water content in the cellulose fiber-containing dispersion is preferably 5% by mass or less, and more preferably 1% by mass or less, with respect to the total mass of the cellulose fiber-containing dispersion. On the other hand, the water content in the cellulose fiber-containing dispersion is preferably 0% by mass.

The content of the ultrafine cellulose fibers in the cellulose fiber-containing dispersion is preferably 0.1% by mass or more, more preferably 1% by mass or more, and further preferably 2% by mass or more, with respect to the total mass of the cellulose fiber-containing dispersion. On the other hand, the content of the ultrafine cellulose fibers is preferably 30% by mass or less, and more preferably 20% by mass or less, with respect to the total mass of the cellulose fiber-containing dispersion.

Examples of a method of obtaining the cellulose fiber-containing dispersion of the present invention may include (1) a method comprising performing a defibration treatment on cellulose fibers in an aqueous solvent, and then re-dispersing the resultant in an organic solvent, and (2) a method of performing a defibration treatment on cellulose fibers in an organic solvent.

In the method (1) above, first, cellulose fibers having phosphoric acid groups or phosphoric acid group-derived substituents are subjected to a defibration treatment in an aqueous solvent to obtain an ultrafine cellulose fiber-containing slurry. Subsequently, the aforementioned organic onium ions are added to the obtained ultrafine cellulose fiber-containing slurry; so as to obtain an aggregate of the ultrafine cellulose fibers or an ultrafine cellulose fiber-containing composition. Thereafter, the obtained ultrafine cellulose fiber aggregate or ultrafine cellulose fiber-containing composition is dispersed in an organic solvent, followed by stirring, so as to obtain a cellulose fiber-containing dispersion.

In the method (2) above, first, a cellulose fiber raw material for obtaining ultrafine cellulose fibers is dispersed in an aqueous solvent, and the aforementioned organic onium ions are then added to the obtained dispersion to obtain an aggregate of the cellulose fiber raw material. This aggregate is dispersed in an organic solvent, and a defibration treatment (fibrillation treatment) is then performed, so that a cellulose fiber-containing dispersion can be obtained.

In the present invention, it is preferable to adopt the method (1) as a method of obtaining a cellulose fiber-containing dispersion having more excellent dispersibility.

In the above-described method (1), when the ultrafine cellulose fibers or the ultrafine cellulose fiber-containing compositions are dispersed in an organic solvent, it is preferable to carry out sufficient stirring. The stirring method is not particularly limited. Examples of the device used in the stirring method may include a high-speed defibrator, a grinder (stone mill-type grinder), a low-pressure homogenizer, a high-pressure homogenizer, an ultra-high pressure homogenizer, a high-pressure collision type crusher, a ball mill, a bead mill, a disk type refiner, a conical refiner, a twin screw kneader, a vibrating null, a device for wet milling, such as a high-speed rotating homomixer, a magnetic stirrer, an ultrasonic disperser, and a beater.

Conditions for dispersing the ultrafine cellulose fibers or the ultrafine cellulose fiber-containing compositions in an organic solvent are not particularly limited. For example, the concentration of the ultrafine cellulose fibers may be adjusted, as appropriate. At this time, addition of the organic solvent may be carried out in a stepwise manner, so that the concentration of the ultrafine cellulose fibers may be adjusted to a desired dispersion concentration. Moreover, the temperature of a solvent, in which the ultrafine cellulose fibers or the ultrafine cellulose fiber-containing compositions are dispersed, may be adjusted, and further, any given components other than the ultrafine cellulose fibers and the organic solvent may also be added to such a solvent for dispersion.

(Cellulose Fiber-Containing Aqueous Dispersion)

The ultrafine cellulose fibers of the present invention may be dispersed or suspended in water to prepare a cellulose fiber-containing aqueous dispersion (cellulose fiber-containing aqueous suspension). In the present description, since the cellulose fiber-containing aqueous dispersion is a dispersion not comprising an organic solvent as a solvent, it is distinguished from the aforementioned cellulose fiber-containing dispersion.

(Method for Producing Cellulose Fibers)

The present invention relates to a method for producing cellulose fibers. Specifically, the method for producing cellulose fibers of the present invention preferably comprises: a step of subjecting cellulose fibers having 0.5 mmol/g or more of phosphoric acid groups or phosphoric acid group-derived substituents to a defibration treatment in an aqueous solvent, to obtain an aqueous dispersion comprising cellulose fibers having a fiber width of 1000 nm or less; and a step of adding at least one selected from organic onium ions having hydrocarbon groups containing 5 or more carbon atoms, and organic onium ions having a total carbon number of 17 or more, to the aqueous dispersion.

In the step of obtaining an aqueous dispersion comprising cellulose fibers having a fiber width of 1000 nm or less, the aforementioned <phosphoric acid group introduction step> and <defibration treatment step> are preferably carried out. In addition, in the step of adding at least one selected from organic onium ions having hydrocarbon groups containing 5 or more carbon atoms, and organic onium ions having a total carbon number of 17 or more, to the aqueous dispersion, the aforementioned <aggregation step> is preferably carried out.

In the step of adding at least one selected from organic onium ions having hydrocarbon groups containing 5 or more carbon atoms, and organic onium ions having a total carbon number of 17 or more, to the aqueous dispersion, the organic onium ions are added in an amount of preferably 2% by mass or more, more preferably 10% by mass or more, further preferably 50% by mass or more, and particularly preferably 100% by mass or more, with respect to the total mass of the ultrafine cellulose fibers. Moreover, at this time, the organic onium ions are added, so that the number of moles of the organic onium ions to be added becomes preferably 0.2 times or more, more preferably 1.0 time or more, and further preferably 2.0 times or more the value obtained by multiplying the amount of substituents comprised in the ultrafine cellulose fibers (the number of moles) and the valence.

In the step of adding at least one selected from organic onium ions having hydrocarbon groups containing 5 or more carbon atoms, and organic onium ions having a total carbon number of 17 or inure, to the aqueous dispersion, an aggregate of ultrafine cellulose fibers is obtained. In the method for producing cellulose fibers of the present invention, after completion of the step of adding at least one selected from organic onium ions having hydrocarbon groups containing 5 or more carbon atoms, and organic onium ions having a total carbon number of 17 or more, to the aqueous dispersion, a step of separating the aggregate and a step of washing the aggregate may be further established. The thus obtained ultrafine cellulose fibers are excellent in terms of dispersibility in an organic solvent.

(Intended Use)

The ultrafine cellulose fibers of the present invention are preferably used in mixing with a resin or an organic solvent. A composition to be mixed with a resin can be used as a reinforcing material for resins. In such a composition to be mixed with a resin, the ultrafine cellulose fibers of the present invention are directly mixed with a resin, so as to form a resin composite in which the ultrafine cellulose fibers are uniformly dispersed. On the other hand, a composition to be mixed with an organic solvent can be used as a thickener or a particle dispersion stabilizer for a system comprising an organic solvent. In particular, such a composition to be mixed with an organic solvent can be preferably used in mixing with an organic solvent comprising a resin component. The ultrafine cellulose fibers of the present invention are mixed with an organic solvent comprising a resin component, so as to form a resin composite in which the ultrafine cellulose fibers are uniformly dispersed. Likewise, an ultrafine cellulose fiber-redispersed slurry is used to form a film, and the thus obtained films can be used as various types of films.

EXAMPLES

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

<Phosphorylation Reaction Step>

As needle bleach kraft pulp, pulp manufactured by Oji Paper Co., Ltd. (solid content: 93% by mass, basis weight: 208 g/m$^2$, sheet-shaped, Canadian Standard Freeness (CSF) measured according to HS P 8121 after defibration: 700 ml) was used as a raw material. Thereafter, to 100 parts by mass (absolute dry mass) of the needle bleach kraft pulp, a mixed aqueous solution of ammonium dihydrogen phosphate and urea was added, and the obtained mixture was then compressed to result in 45 parts by mass of the ammonium dihydrogen phosphate, 120 parts by mass of the urea and 150 parts by mass of ion exchange water, so as to obtain chemical-impregnated pulp. The obtained chemical-impregnated pulp was dried in a hot-air dryer of 165° C. for 200 seconds to perform a drying/heating treatment, so that phosphoric acid groups were introduced into cellulose in the pulp, thereby obtaining phosphorylated pulp.

<Dehydration Washing Step>

Ion exchange water was poured onto the obtained phosphorylated pulp, which was then uniformly dispersed by stirring. Thereafter, filtration and dehydration were performed on time resultant to obtain a dehydrated sheet. By repeating this operation, redundant chemical liquid was fully washed away, so as to obtain a dehydrated sheet A of the phosphorylated pulp.

<Phosphorylation Performed Multiple Times>

Using the obtained dehydrated sheet A of the phosphorylated pulp as a raw material, the above-described phosphorylation reaction step and dehydration washing step were repeated one more time (the total number of phosphorylation steps: twice) to obtain a dehydrated sheet B of the phosphorylated pulp.

<Defibration Treatment>

Ion exchange water was added to the obtained dehydrated sheet B of the phosphorylated pulp to prepare a pulp suspension having a solid concentration of 2.0% by mass. This pulp suspension was treated using a wet atomization apparatus (manufactured by Sugino Machine Limited, Ultimizer) at a pressure of 200 MPa six times to obtain a slurry containing 2.0% by mass of ultrafine cellulose fibers. The amount of phosphoric acid groups introduced into the ultrafine cellulose fibers in the obtained ultrafine cellulose fiber-containing slurry was 1.8 mmol/g. The fiber width of the obtained ultrafine cellulose fibers was measured under a transmission electron microscope. As a result, the fiber width was 3 to 5 nm.

<Aggregation Step>

Ion exchange water was added to the obtained slurry containing 2.0% by mass of ultrafine cellulose fibers, which was then uniformly homogenized by stirring, so that the slurry was diluted to result in a solid concentration of 0.5% by mass. 4.63 mL of 1 N hydrochloric acid was added to 100 g of an aqueous solution containing 1.7% by mass of N,N-didodecylmethylamine for neutralization, and the obtained solution was then added to 100 g of the obtained slurry containing 0.5% by mass of ultrafine cellulose fibers. The obtained mixture was subjected to a stirring treatment using a disperser for 5 minutes. As a result, an aggregate was generated in the ultrafine cellulose fiber-containing slurry. The ultrafine cellulose fiber-containing slurry, in which the aggregate was generated, was subjected to vacuum filtration, so as to recover an ultrafine cellulose fiber aggregate (before washing). It is to be noted that the number of moles of the N,N-didodecylmethylamine to be added to the ultrafine cellulose fiber-containing slurry was set to be 2.5 times the value obtained by multiplying the amount (the number of moles) of substituents comprised in the ultrafine cellulose fibers in the slurry and the valence.

<Aggregate Washing Step>

By repeatedly washing the obtained ultrafine cellulose fiber aggregate (before washing) with ion exchange water, redundant N,N-didodecylmethylamine, hydrochloric acid, eluted ions and the like were removed from the ultrafine cellulose fiber aggregate, thereby obtaining ultrafine cellulose fibers. The solid concentration of the obtained ultrafine cellulose fibers was 89% by mass. The yield of the ultrafine cellulose fibers in a supernatant, which was obtained by subjecting an aqueous dispersion of the obtained ultrafine cellulose fibers to a centrifugation treatment, was measured by the after-mentioned method.

<Redispersion Step>

To 1.0 g (absolute dry mass) of the obtained ultrafine cellulose fibers, 49 g of dimethyl sulfoxide (DMSO) was added. Thereafter, using an ultrasonic processor (manufactured by Hielscher, UP400S), an ultrasonic treatment was carried out for 5 minutes to obtain an ultrafine cellulose fiber-redispersed slurry (cellulose fiber-containing dispersion). The viscosity and total light transmittance of the obtained ultrafine cellulose fiber-redispersed slurry were measured by the after-mentioned methods.

Example 2

Ultrafine cellulose fibers and an ultrafine cellulose fiber-redispersed slurry were obtained in the same manner as that of Example 1, with the exception that, in the <aggregation step> of Example 1, 4.63 mL of 1 N hydrochloric acid was added to 100 g of an aqueous solution containing 1.3% by mass of polyoxyethylene dodecylamine (the number of oxyethylene residues: 2) for neutralization, and the obtained solution was then added to the slurry, followed by performing a stirring treatment. The solid concentration of the obtained ultrafine cellulose fibers was 89% by mass.

Example 3

Ultrafine cellulose fibers and an ultrafine cellulose fiber-redispersed slurry were obtained in the same manner as that of Example 1, with the exception that, in the <aggregation step> of Example 1, 100 g of an aqueous solution containing 1.6% by mass of alkyldimethylbenzyl ammonium chloride was added to the slurry, followed by performing a stirring treatment. The solid concentration of the obtained ultrafine cellulose fibers was 86% by mass.

Example 4

Ultrafine cellulose fibers and an ultrafine cellulose fiber-redispersed shiny were obtained in the same manner as that of Example 1, with the exception that, in the <redispersion step> of Example 1, 49 g of N,N-dimethylformamide (DMF) was added to 1.0 g (absolute dry mass) of the ultrafine cellulose fibers, followed by performing an ultrasonic treatment.

Example 5

Ultrafine cellulose fibers and an ultrafine cellulose fiber-redispersed slurry were obtained in the same manner as that of Example 1, with the exception that, in the <redispersion step> of Example 1, 49 g of N-methyl-2-pyrrolidone (NMP) was added to 1.0 g (absolute dry mass) of the ultrafine cellulose fibers, followed by performing an ultrasonic treatment.

Example 6

Ultrafine cellulose fibers and an ultrafine cellulose fiber-redispersed slurry were obtained in the same manner as that of Example 1, with the exceptions that, in the <aggregation step> of Example 1, 4.63 mL of 1 N hydrochloric acid was added to 100 g of an aqueous solution containing 1.2% by mass of stearyiamine for neutralization, and the obtained solution was added to the slurry, followed by performing a stirring treatment, and then, in the <redispersion step>, 49 g of toluene was added to the 1.0 g (absolute dry mass) of the ultrafine cellulose fibers, followed by performing an ultrasonic treatment. The solid concentration of the obtained ultrafine cellulose fibers was 90% by mass.

Example 7

Ultrafine cellulose fibers and an ultrafine cellulose fiber-redispersed slurry were obtained in the same manner as that of Example 6, with the exceptions that, in the <aggregation step> of Example 6, 100 g of an aqueous solution containing 2.6% by mass of di-n-alkyldimethyl ammonium chloride was added to the slurry, followed by performing a stirring treatment. The solid concentration of the obtained ultrafine cellulose fibers was 90% by mass.

Example 8

Ultrafine cellulose fibers and an ultrafine cellulose fiber-redispersed slurry were obtained in the same manner as that of Example 5, with the exceptions that, the <phosphorylation performed multiple times> was not carried out in Example 5. The amount of phosphoric acid groups introduced into the obtained phosphorylated pulp was 1.1 mmol/g.

Example 9

Ultrafine cellulose fibers and an ultrafine cellulose fiber-redispersed slurry were obtained in the same manner as that of Example 8, with the exceptions that, in the <phosphorylation reaction step> of Example 8, the chemical-impregnated pulp was dried in a hot-air dryer of 165° C. for 150 seconds to perform a drying/heating treatment. The amount of phosphoric acid groups introduced into the obtained phosphorylated pulp was 0.9 mmol/g.

Example 10

Ultrafine cellulose fibers and an ultrafine cellulose fiber-redispersed slurry were obtained in the same manner as that of Example 7, with the exceptions that, in the <redispersion step> of Example 7, 49 g of p-xylene was added to 1.0 g (absolute dry mass) of the ultrafine cellulose fibers, followed by performing an ultrasonic treatment.

Example 11

Ultrafine cellulose fibers and an ultrafine cellulose fiber-redispersed slurry were obtained in the same manner as that of Example 3, with the exceptions that, in the <redispersion step> of Example 3, 49 g of methanol was added to 1.0 g (absolute dry mass) of the ultrafine, cellulose fibers, followed by performing an ultrasonic treatment.

Example 12

Ultrafine cellulose fibers and an ultrafine cellulose fiber-redispersed slurry were obtained in the same manner as that of Example 2, with the exceptions that, in the <redispersion step> of Example 2, 49 g of 2-pyrrolidinone was added to 1.0 g (absolute dry mass) of the ultrafine, cellulose fibers, followed by performing an ultrasonic treatment.

Comparative Example 1

<TEMPO Oxidation Reaction>
Undried needle bleached kraft pulp corresponding to a dry mass of 100 parts by mass, 1.6 parts by mass of TEMPO (2,2,6,6-tetramethylpiperidin-1-oxyl), and 10 parts by mass of sodium bromide were dispersed in 10000 parts by mass of water. Subsequently, an aqueous solution containing 13% by mass of sodium hypochlorite was added to the pulp such that the amount of sodium hypochlorite became 10.0 mmol with respect to 1.0 g of the pulp, so as to start the reaction. During the reaction, the pH was kept at pH 10 or more and pH 11 or less by the dropwise addition of a 0.5 M sodium hydroxide aqueous solution. The time point at which change in the pH was no longer seen was considered to be termination of the reaction.

<Washing of TEMPO-Oxidized Pulp>
Thereafter, this pulp slurry was dehydrated to obtain a dehydrated sheet, and 5000 parts by mass of ion exchange water was poured onto the pulp, which was then uniformly dispersed by stirring, and then, filtration and dehydration were performed on the resultant to obtain a dehydrated sheet. This step was repeated twice.

The <defibration treatment>, <aggregation step>, <aggregate washing step>, and <redispersion step> were carried out on the obtained TEMPO-oxidized pulp in the same manner as that of Example 1, so as to obtain ultrafine cellulose fibers and an ultrafine cellulose fiber-redispersed slurry. In the defibration treatment step, the amount of carboxyl groups introduced into the ultrafine cellulose fibers in the obtained ultrafine cellulose fiber-containing slurry was 1.8 mmol/g. In addition, after completion of the aggregate washing step, the solid concentration of the obtained ultrafine cellulose fibers was 89% by mass. The fiber width of the obtained ultrafine cellulose fibers was measured under a transmission electron microscope. As a result, the fiber width was 3 to 5 nm.

Comparative Example 2

Ultrafine cellulose fibers and an ultrafine cellulose fiber-redispersed slurry were obtained in the same manner as that of Comparative Example 1, with the exception that, in the <redispersion step> of Comparative Example 1, 49 g of N-methyl-2-pyrrolidone (NMP) was added to 1.0 g (absolute dry mass) of the ultrafine cellulose fibers, followed by performing an ultrasonic treatment.

Comparative Example 3

Ultrafine cellulose fibers and an ultrafine cellulose fiber-redispersed slurry were obtained in the same manner as that of Comparative Example 1, with the exception that, in the <aggregation step> of Comparative Example 1, 100 g of an aqueous solution containing 2.6% by mass of di-n-alkyldimethyl ammonium chloride was added and a stirring treatment was carried out, and then, in the <redispersion step>, 49 g of toluene was added to 1.0 g (absolute dry mass) of the ultrafine cellulose fibers, followed by performing an ultrasonic treatment. The solid concentration of the obtained ultrafine cellulose fibers was 90% by mass.

Comparative Example 4

TEMPO-oxidized pulp (TEMPO-oxidized cellulose fibers), ultrafine cellulose fibers and an ultrafine cellulose fiber-redispersed slurry were obtained in the same manner as that of Comparative Example 1, with the exception that, in the <TEMPO oxidation reaction> of Comparative Example 1, an aqueous solution containing 13% by mass of sodium hypochlorite was added to the pulp such that the amount of sodium hypochlorite became 3.8 mmol with respect to 1.0 g of the pulp. The amount of carboxyl groups introduced into the obtained TEMPO-oxidized pulp (TEMPO-oxidized cellulose fibers) was 1.3 mmol/g. The solid concentration of the obtained ultrafine cellulose fibers was 89% by mass.

Comparative Example 5

The same operations as the <phosphorylation reaction step dehydration washing step>, and <phosphorylation performed multiple times> of Example 1 were carried out to obtain a dehydrated sheet B of the phosphorylated pulp.
<Alkali Treatment>

Subsequently, the obtained dehydrated sheet B of the phosphorylated pulp was diluted with ion exchange water to result in a solid concentration of 2% by mass, and a 1 N sodium hydroxide aqueous solution was slowly added to the diluted solution, while stirring, so as to obtain a pulp slurry with pH 12±0.2. Thereafter, this pulp slurry was dehydrated to obtain a dehydrated sheet, and ion exchange water was then poured on the sheet again, which was then uniformly dispersed by stirring. Thereafter, filtration and dehydration were performed on the resultant to obtain a dehydrated sheet. By repeating this operation, redundant sodium hydroxide was fully washed away, so as to obtain a dehydrated sheet C of the phosphorylated pulp.
<Defibration Treatment>

A defibration treatment was performed on the obtained dehydrated sheet C of the phosphorylated pulp in the same manner as the <defibration treatment> of Example 1, to obtain a slurry containing 2.0% by mass of ultrafine cellulose fibers. The fiber width of the obtained ultrafine cellulose fibers was measured under a transmission electron microscope. As a result, the fiber width was 3 to 5 nm.
<Aggregation and Washing Step>

To 20 parts by mass of the obtained slurry containing 2.0% by mass of ultrafine cellulose fibers, 80 parts by mass of isopropanol (IPA) was added, and the obtained mixture was then subjected to a stirring treatment with a disperser for 5 minutes. Thereafter, an aggregate generated in the slurry was recovered by filtration. Water remaining in the aggregate was removed by repeatedly washing the aggregate with IPA, so as to obtain ultrafine cellulose fibers. The solid concentration of the obtained ultrafine cellulose fibers was 91% by mass.
<Redispersion Step>

The obtained ultrafine cellulose fibers were subjected to the same <redispersion step> as that of Example 6, to obtain an ultrafine cellulose fiber-redispersed slurry.

Comparative Example 6

Ultrafine cellulose fibers and an ultrafine cellulose fiber-redispersed slurry were obtained in the same manner as that of Comparative Example 5, with the exception that the <alkali treatment> was not carried out in Comparative Example 5, The solid concentration of the obtained ultrafine cellulose fibers was 91% by mass.

Comparative Example 7

Ultrafine cellulose fibers and an ultrafine cellulose fiber-redispersed slurry were obtained in the same manner as that of Comparative Example 5, with the exception that, in the <alkali treatment> of Comparative Example 5, an aqueous solution containing 55% by mass of tetramethyl ammonium hydroxide was used instead of a 1 N hydrochloric acid aqueous solution. The solid concentration of the obtained ultrafine cellulose fibers was 89% by mass.

Comparative Example 8

Ultrafine cellulose fibers and an ultrafine cellulose fiber-redispersed slurry were obtained in the same manner as that of Comparative Example 5, with the exception that, in the <alkali treatment> of Comparative Example 5, an aqueous solution containing 55% by mass of tetrabutyl ammonium hydroxide was used instead of a 1 N hydrochloric acid aqueous solution, and then, in the <aggregation and washing step>, methyl ethyl ketone (MEK) was used instead of isopropanol (IPA). The solid concentration of the obtained ultrafine cellulose fibers was 89% by mass.

Reference Example 1

The same operations as the <phosphorylation reaction step>, <dehydration washing step>, <phosphorylation performed multiple times>, and <defibration treatment> of Example 1 were carried out to obtain a slurry containing 2.0% by mass of ultrafine cellulose fibers. Ion exchange water was added to the slurry containing 2.0% by mass of ultrafine cellulose fibers, and the obtained mixture was then stirred so that it became sufficiently homogenized, and was diluted to result in a solid concentration of 0.5% by mass. Thereafter, 0.31 g of an aqueous solution containing 55% by mass of tetramethyl ammonium hydroxide was neutralized with 1.85 mL of 1 N hydrochloric acid, and the thus obtained solution was then added to the 100 g of obtained slurry containing 0.5% by mass of ultrafine cellulose fibers, followed by performing a stirring treatment with a disperser for 5 minutes. However, no aggregates were generated in the ultrafine cellulose fiber-containing slurry.

Reference Example 2

A stirring treatment was performed using a disperser in the same manner as that of Reference Example 1, with the exception that 0.31 g of an aqueous solution containing 55% by mass of tetrabutyl ammonium hydroxide was neutralized with 1.85 mL of 1 N hydrochloric acid and the resulting solution was then added to the slurry. However, no aggregates were generated in the ultrafine cellulose fiber-containing slurry.
(Analysis and Evaluation)
<Measurement of Amount of Phosphoric Acid Groups>

The amount of phosphoric acid groups in the ultrafine cellulose fibers was measured by adding ion exchange water to an ultrafine cellulose fiber-containing slurry comprising the ultrafine cellulose fibers as targets to result in a solid concentration of 0.2% by mass, then treating the slurry with an ion exchange resin, and then titrating it with alkali.

In the treatment with the ion exchange resin, 1/10 by volume of a strongly acidic ion exchange resin (Amberjet 1024; manufactured by Organo Corporation; conditioned) was added to a slurry containing 0.2% by mass of the ultrafine cellulose fibers, and the resultant mixture was shaken for 1 hour. Then, the mixture was poured onto a mesh having 90-μm apertures to separate the resin from the slurry.

In the alkali titration, the change in the electric conductivity value indicated by the slurry was measured while adding an aqueous solution of 0.1 N sodium hydroxide to the slurry containing ultrafine cellulose fibers after completion of the treatment with an ion exchange resin. Specifically, among the calculation results, the alkali amount (mmol)

required in a region corresponding to the first region shown in FIG. 1 was divided by the solid content (g) in the slurry to be titrated, so as to obtain the amount of phosphoric acid groups (mmol/g).

<Measurement of Amount of Carboxyl Groups>

The amount of carboxyl groups in the ultrafine cellulose fibers was measured by adding ion exchange water to an ultrafine cellulose fiber-containing slurry comprising the ultrafine cellulose fibers as targets to result in a content of 0.2% by mass, then treating the slurry with an ion exchange resin, and then titrating it with alkali.

In the treatment with the ion exchange resin, 1/10 by volume of a strongly acidic ion exchange resin (Amberjet 1024; manufactured by Organo Corporation; conditioned) was added to a slurry containing 0.2% by mass of the ultrafine cellulose fibers, and the resultant mixture was shaken for 1 hour. Then, the mixture was poured onto a mesh having 90-μm apertures to separate the resin from the slurry.

In the alkali titration, the change in the electric conductivity value indicated by the slurry was measured while adding an aqueous solution of 0.1 N sodium hydroxide to the slurry containing ultrafine cellulose fibers after completion of the treatment with an ion exchange resin. Specifically among the calculation results, the alkali amount (mmol) required in a region corresponding to the first region shown in FIG. 2 was divided by the solid content (g) in the slurry to be titrated, so as to obtain the amount of carboxyl groups (mmol/g).

<Measurement of Supernatant Yield After Centrifugation Treatment>

Ion exchange water was added to the ultrafine cellulose fibers to prepare an aqueous dispersion A comprising cellulose fibers having a solid concentration of 0.5% by mass. Thereafter, using a defibration treatment device (high-speed rotation defibration treatment device), a defibration treatment was carried out on the aqueous dispersion A under conditions of 21500 rotations/minute for 30 minutes, to obtain an aqueous dispersion B. Subsequently, ion exchange water was added to the aqueous dispersion B to prepare an aqueous dispersion C having a solid concentration of 0.2% by mass. A centrifugation treatment was carried out on the aqueous dispersion C under conditions 12000 G and 15° C. for 10 minutes, and a supernatant was recovered. The solid concentration in the recovered supernatant was measured, and a supernatant yield was then calculated according to the following equation. Besides, in the centrifugation treatment step, a high-speed cooling centrifuge was used.

Supernatant yield (%) solid concentration (% by mass) in supernatant/0.2 (% by mass)×100

<Method for Measuring Total Light Transmittance of Ultrafine Cellulose Fiber-Containing Slurry>

In the measurement of total light transmittance, the total light transmittance of the slurry containing 2.0% by mass of ultrafine cellulose fibers obtained in the redispersion step was measured. The total light transmittance was measured using a haze meter (manufactured by MURAKAMI COLOR RESEARCH LABORATORY Co., Ltd., HM-150) and a glass cell for liquid having an optical path length of 1 cm (manufactured by Fujiwara Scientific Company Co., Ltd., MG-40, inverse optical path), in accordance with JIS K 7361. It is to be noted that the measurement of zero point was carried out with ion exchange water filled in the same glass cell as that described above. The total light transmittance was measured immediately after completion of the redispersion step of each of Examples and Comparative Examples.

<Method for Measuring Viscosity of Ultrafine Cellulose Fiber-Containing Slurry>

The viscosity of the ultrafine cellulose fiber-containing slurry was measured by leaving the slurry containing 2.0% by mass of ultrafine cellulose fibers obtained after completion of the redispersion step at rest at 25° C. for 24 hours, and then using a type B viscometer (manufactured by BROOKFIELD; analog viscometer T-LVT). Regarding measurement conditions, the slurry was rotated at 25° C. at 6 rpm for 3 minutes, and the viscosity thereof was then measured.

TABLE 1

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Properties after dispersion in organic solvent | | |
|---|---|---|---|---|---|---|---|---|---|
| | | | | | | | Precipitation | Viscosity [mPa · s] at 2.0 mass % | Total light transmittance [%] at 2.0 mass % |
| Ex. 1 | Phosphoric acid group | 1.8 | N,N-didodecyl methyl ammonium | 89 | 16 | DMSO | Not precipitated | >100000 | 93.3 |
| Ex. 2 | | | Polyoxyethylene dodecyl ammonium | 89 | 19 | | Not precipitated | 51400 | 91.9 |
| Ex. 3 | | | Alkyl dimethyl benzyl ammonium | 86 | 18 | | Not precipitated | >100000 | 56.2 |
| Comp. Ex. 1 | Carboxy group | 1.8 | N,N-didodecyl methyl ammonium | 89 | 20 | | Not precipitated | 6680 | 71.7 |

TABLE 2

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Properties after dispersion in organic solvent | | |
|---|---|---|---|---|---|---|---|---|---|
| | | | | | | | Precipitation | Viscosity [mPa · s] at 2.0 mass % | Total light transmittance [%] at 2.0 mass % |
| Ex. 4 | Phosphoric acid group | 1.8 | N,N-didodecyl methyl ammonium | 89 | 16 | DMF | Not precipitated | 1638 | 69.6 |

TABLE 3

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Properties after dispersion in organic solvent | | |
|---|---|---|---|---|---|---|---|---|---|
| | | | | | | | Precipitation | Viscosity [mPa · s] at 2.0 mass % | Total light transmittance [%] at 2.0 mass % |
| Ex. 5 | Phosphoric acid group | 1.8 | N,N-didodecyl methyl ammonuim | 89 | 16 | NMP | Not precipitated | 21900 | 97.8 |
| Ex. 8 | | 1.2 | N,N-didodecyl methyl ammonium | 89 | 20 | | Not precipitated | 3520 | 89.3 |
| Ex. 9 | | 0.9 | N,N-didodecyl methyl ammonium | 89 | 22 | | Not precipitated | 2340 | 90.6 |
| Comp. Ex. 2 | Carboxy group | 1.8 | N,N-didodecyl methyl ammonium | 89 | 20 | | Not precipitated | 5360 | 95.8 |
| Comp. Ex. 4 | | 1.3 | N,N-didodecyl methyl ammounium | 89 | 22 | | Not precipitated | 1185 | 87.0 |

TABLE 4

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Properties after dispersion in organic solvent | | |
|---|---|---|---|---|---|---|---|---|---|
| | | | | | | | Precipitation | Viscosity [mPa · s] at 2.0 mass % | Total light transmittance [%] at 2.0 mass % |
| Ex. 6 | Phosphoric acid group | 1.8 | Stearyl ammonium | 90 | 12 | Toluene | Not pecipitated | 54.4 | 91.1 |
| Ex. 7 | | | di-n-Alkyl dimethyl ammonium | 90 | 18 | | Not precipitated | 330 | 98.3 |
| Comp. Ex. 3 | Carboxy group | 1.8 | di-n-Alkyl dimethyl ammonium | 90 | 22 | | Not precipitated | <50 | 97.3 |
| Comp. Ex. 5 | Phosphoric | 1.8 | Sodium ion | 91 | 99 | | Precipitated | Unmeasurable due to precipitation | |

TABLE 4-continued

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Precipitation | Viscosity [mPa·s] at 2.0 mass % | Total light transmittance [%] at 2.0 mass % |
|---|---|---|---|---|---|---|---|---|---|
| Comp. Ex. 6 | acid group | | Ammonium ion | 91 | 99 | | Precipitated | | |
| Comp. Ex. 7 | | | Tetramethyl ammonium | 89 | 99 | | Precipitated | | |
| Comp. Ex. 8 | | | Tetabutyl ammonium | 90 | 99 | | Precipitated | | |

TABLE 5

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Precipitation | Viscosity [mPa·s] at 2.0 mass % | Total light transmittance [%] at 2.0 mass % |
|---|---|---|---|---|---|---|---|---|---|
| Ex. 10 | Phosphoric acid group | 1.8 | di-n-Alkyl dimethyl ammonium | 90 | 18 | p-Xylene | Not precipitated | 498 | 97.3 |

TABLE 6

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Precipitation | Viscosity [mPa·s] at 2.0 mass % | Total light transmittance [%] at 2.0 mass % |
|---|---|---|---|---|---|---|---|---|---|
| Ex. 11 | Phosphoric acid group | 1.8 | Alkyl dimethyl benzyl ammonium | 89 | 18 | Methanol | Not precipitated | 23000 | 86.2 |

TABLE 7

| | Ionic functional group of cellulose | Substituent content [mmol/g] | Counterion of ionic functional group Type | Solid concentration before dispersion in organic solvent [mass %] | Supernatant yield after centrifugation [%] | Target solvent (type) | Precipitation | Viscosity [mPa·s] at 2.0 mass % | Total light transmittance [%] at 2.0 mass % |
|---|---|---|---|---|---|---|---|---|---|
| Ex. 12 | Phosphoric acid group | 1.8 | Polyoxyethylene dodecyl ammonium | 89 | 19 | 2-Pyrrolidinone | Not precipitated | >100000 | 68.7 |

It is found that, in the Examples, ultrafine cellulose fibers having excellent dispersibility in an organic solvent were obtained. Specifically, ultrafine cellulose fibers, which could exhibit high viscosity after it had been dispersed in an organic solvent, were obtained.

Moreover, as is clear from the results of Examples 8 and 9, the ultrafine cellulose fibers of the present invention were excellent in terms of dispersibility in an organic solvent, even in a case where the amount of phosphoric acid groups introduced therein was small.

In Examples 1 to 12 and Comparative Examples 1 to 4, the fiber width of the ultrafine cellulose fibers obtained after completion of the <redispersion step> was measured under a transmission electron microscope. As a result, it was found that the fiber width of the ultrafine cellulose fibers comprised in the dispersion was in the range of 3 to 100 nm.

The invention claimed is:

1. Cellulose fibers having a fiber width of 1000 nm or less and having phosphoric acid groups or phosphoric acid group-derived substituents, wherein
a content of the phosphoric acid groups or phosphoric acid group-derived substituents is 0.5 mmol/g or more, and
a supernatant yield measured by the following measurement method (a) is 70% or less;
measurement method (a):
an aqueous dispersion A of the cellulose fibers having a solid concentration of 0.5% by mass is prepared, a defibration treatment is then performed on the aqueous dispersion A using a defibration treatment device under conditions of 21500 rotations/minute for 30 minutes to obtain an aqueous dispersion B; subsequently, the aqueous dispersion B is converted to an aqueous dispersion C having a solid concentration of 0.2% by mass, which is then subjected to a centrifugation treatment under conditions of 12000 G and 15° C. for 10 minutes, and then, a supernatant is recovered; and the solid concentration in the recovered supernatant is measured, and a supernatant yield is then calculated according to the following equation:

Supernatant yield (%)=solid concentration (% by mass) in supernatant/0.2 (% by mass)×100.

2. The cellulose fibers according to claim 1, comprising at least one selected from organic onium ions having at least one hydrocarbon group containing 5 or more carbon atoms, and organic onium ions having a total carbon number of 17 or more, as counterions of the phosphoric acid groups or the phosphoric acid group-derived substituents.

3. The cellulose fibers according to claim 2, wherein the organic onium ions are organic ammonium.

4. A cellulose fiber-containing composition comprising 85% by mass or more of the cellulose fibers according to claim 1.

5. A cellulose fiber-containing dispersion comprising the cellulose fibers according to claim 1 and an organic solvent.

6. The cellulose fiber-containing dispersion according to claim 5, wherein the dielectric constant of the organic solvent at 25° C. is 60 or less.

7. A method for producing the cellulose fibers according to claim 1, comprising:
subjecting cellulose fibers having 0.5 mmol/g or more of phosphoric acid groups or phosphoric acid group-derived substituents to a defibration treatment in an aqueous solvent, to obtain an aqueous dispersion comprising cellulose fibers having a fiber width of 1000 nm or less; and
adding at least one selected from organic onium ions having at least one hydrocarbon group containing 5 or more carbon atoms, and organic onium ions having a total carbon number of 17 or more, to the aqueous dispersion.

* * * * *